No. 808,670. PATENTED JAN. 2, 1906.
T. F. MASON.
WINDLASS.
APPLICATION FILED FEB. 17, 1905.
2 SHEETS—SHEET 1.
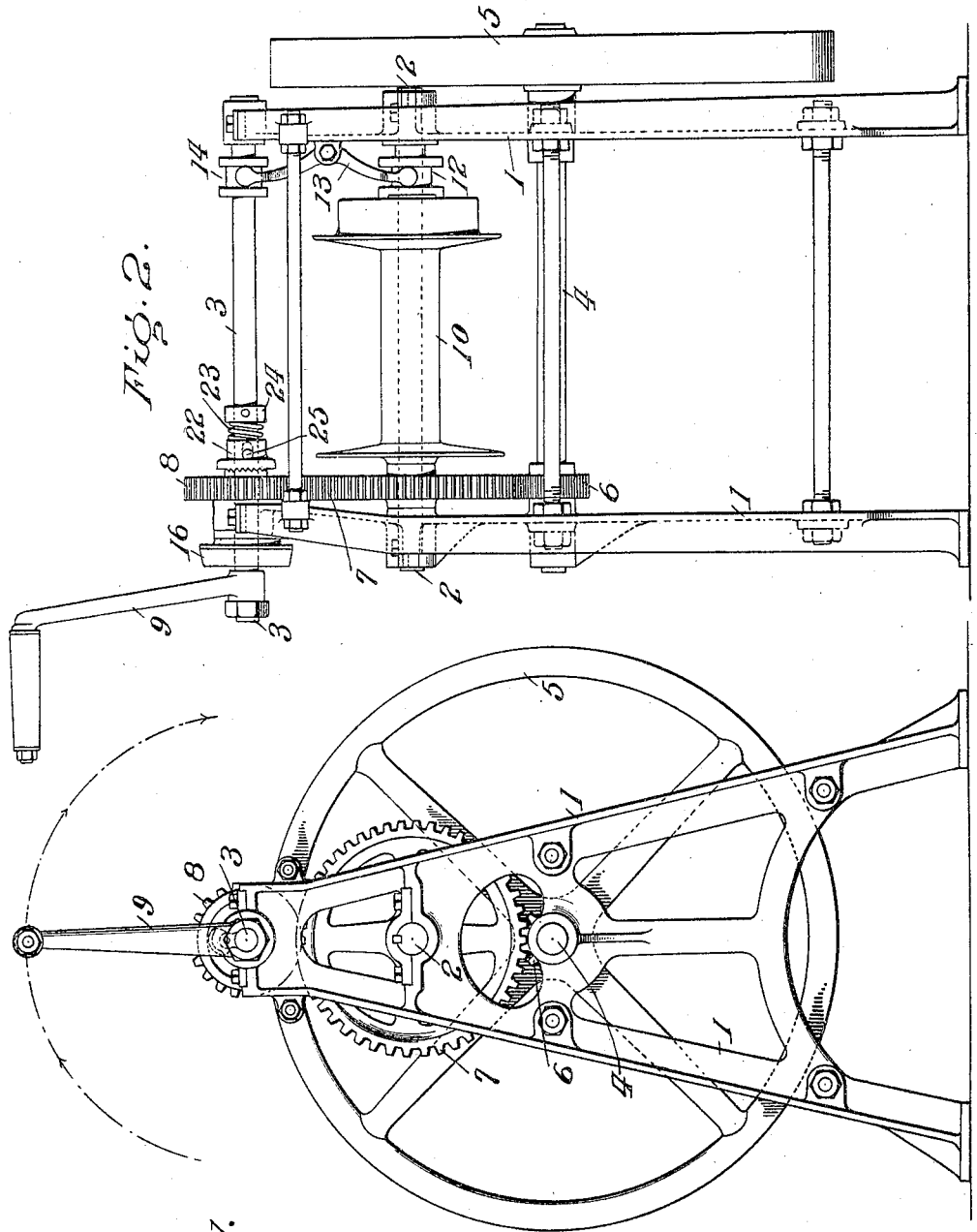

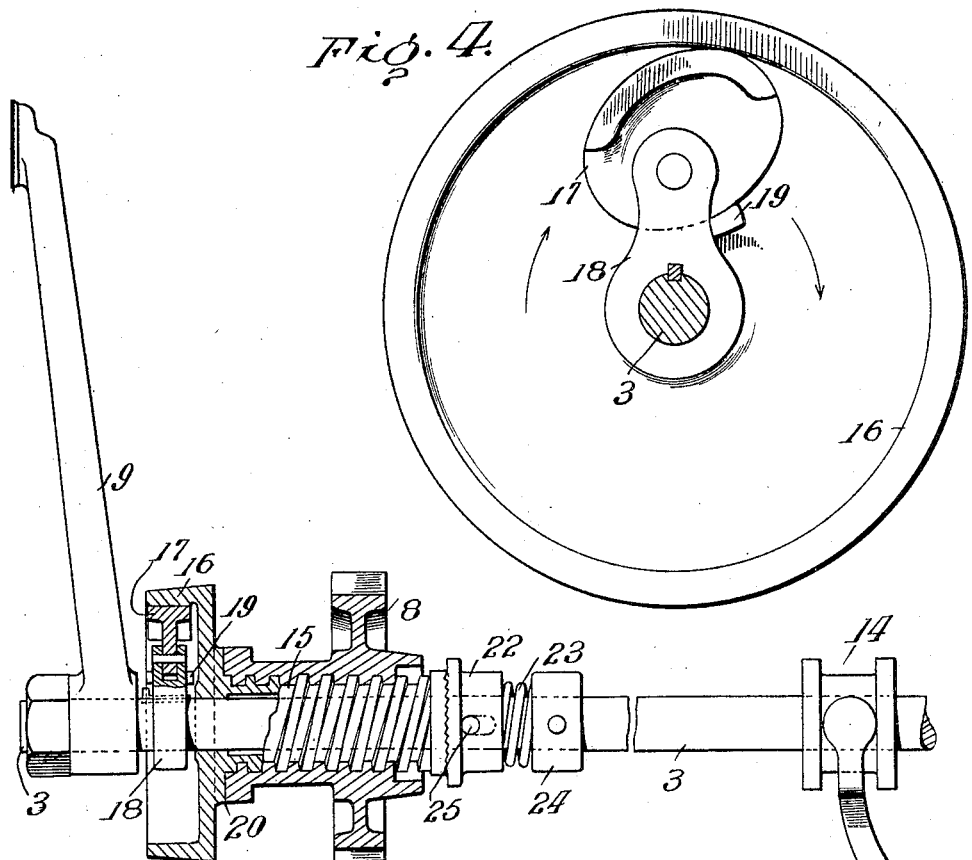
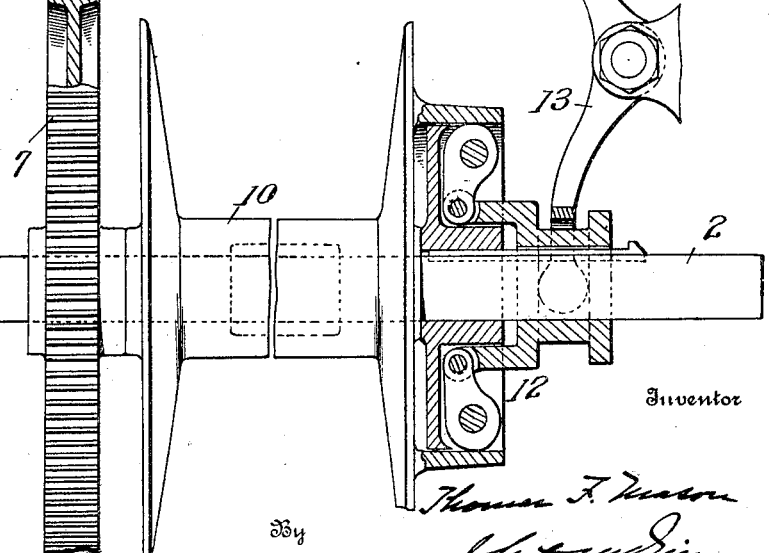

UNITED STATES PATENT OFFICE.

THOMAS F. MASON, OF COLONIAL BEACH, VIRGINIA, ASSIGNOR OF ONE-HALF TO THOMAS PERRY WATSON, OF COLONIAL BEACH, VIRGINIA.

WINDLASS.

No. 808,670.     Specification of Letters Patent.     Patented Jan. 2, 1906.

Application filed February 17, 1905. Serial No. 246,168.

*To all whom it may concern:*

Be it known that I, THOMAS FREELAND MASON, of Colonial Beach, in the county of Westmoreland and State of Virginia, have invented certain new and useful Improvements in Windlasses; and I do hereby declare the following to be a full, clear, and exact description of the invention, such as will enable others skilled in the art to which it appertains to make and use the same.

The primary object of this invention is to provide a windlass whereon the winding of a rope may be discontinued at any intermediate point and again resumed without calling for any undue exertion on the part of the operator.

The invention comprehends a windlass having means for readily disengaging the drum from its actuating-shaft and means for storing or utilizing power acquired in the winding operation, so that if during the latter the drum be allowed to move independently of its shaft it will upon being again thrown into engagement therewith be automatically actuated by such stored power.

The invention will be hereinafter fully set forth, and particularly pointed out in the claims.

In the accompanying drawings, Figure 1 is a front elevation. Fig. 2 is an end view. Fig. 3 is an enlarged fragmentary view with parts in section and others broken away. Fig. 4 is a detail.

Referring to the drawings, 1 designates a frame of any preferred construction having suitable bearings for the drum-shaft 2, the counter-shaft 3, and the fly-wheel shaft 4. Upon the latter is mounted a large fly-wheel 5 and a small gear-pinion 6, which meshes with a larger gear-wheel 7, fast on shaft 2, which gear-wheel in turn engages a smaller gear-wheel 8, to which the counter-shaft 3 is designed to be locked, said counter-shaft carrying the operating crank-handle 9. The drum or spool 10 on shaft 2 may be locked to or disengaged from said shaft by a clutch 12, which clutch is actuated by a lever 13, fulcrumed on one of the sides of frame 1. The other end of this lever engages a collar 14 on shaft 3. Hence by moving the latter longitudinally lever 13 may be shifted to throw in or out the clutch of the drum or spool.

It is sought by my invention to provide for the actuation of counter-shaft 3 and through it the train of gearing and the fly-wheel when the crank-handle is turned in one direction and yet when the crank-handle is held stationary allow such fly-wheel and gearing to continue their rotation and at the same time effect the automatic disengagement of the drum or spool from its shaft. For this purpose the hub of the gear-wheel 8 is elongated and interiorly threaded to conform to an exteriorly-threaded sleeve 15, movable longitudinally with shaft 3, said sleeve at one end carrying a flanged disk 16, with which a clutch-dog 17 is designed to frictionally engage when the crank-handle is turned in one direction, such dog consisting of an eccentric member mounted on an arm 18, keyed to shaft 3, a shoulder 19 limiting the movement of such dog in one direction. When shaft 3 is held stationary or moved in a reverse direction, this dog will be thrown out of frictional engagement with the flanged disk. When in engagement with such disk, the turning of shaft 3 will cause the threaded sleeve to travel inwardly until the shoulder 20 thereof is brought into firm contact with the outer end of the hub of gear-wheel 8. When in this position, the inner serrated end of the sleeve will engage the correspondingly-serrated face of a spring-pressed collar 22, mounted on shaft 3, the spring 23 thereof being held by a stationary collar 24, the range of movement of collar 22 being limited by a pin 25, working in a short slot of the shaft. When the threaded sleeve is thus thrown into engagement with the gear-wheel, shaft 3 being moved longitudinally therewith, the spool or drum is locked to its shaft through the shifting of lever 13; but when the crank-handle is held stationary the shaft and sleeve are caused to travel outwardly, the wheel 8 continuing to revolve, and as the flange of collar 22 is brought into engagement with the inner end of the hub of such wheel not only will the shaft be disengaged from the sleeve, but the drum will be unclutched from its shaft, sleeve 15 then being free to revolve with the gear-wheel.

In practice the winding of a rope or cable is very easily accomplished by one person by reason of the power obtained by the described train of gearing, such winding being greatly facilitated by the aid of the fly-wheel. It often transpires, especially in oyster-dredging, that it is necessary to discontinue the winding at some intermediate point to allow of the immediate pay of the rope, the further winding being almost immediately resumed. Now by means of my invention it is only necessary when it is desired to let the drum revolve to unwind the rope for the operator to hold the crank-handle stationary, thereby throwing out the clutch-dog from binding engagement with the flanged end of the threaded sleeve 15 and allow such sleeve, together with shaft 3, to move longitudinally within the gear-wheel until the shaft has moved sufficiently to unlock the drum from its shaft. Immediately the drum begins to pay out the rope, although the fly-wheel and gearing continue to revolve as before. As soon as sufficient play of the rope has been had and the winding operation is again started the operator has only to turn the crank-handle and shaft 3 at a slightly greater speed than that of the gear-wheel 8, so as to thereby again lock sleeve 15 and said shaft to said gear-wheel, thereby throwing the drum into engagement with its shaft. The power stored up by the fly-wheel enables the winding operation to be readily resumed, there being practically no dead-centers to overcome by the operator.

Although I have described the best means known to me for carrying out my invention, yet it is to be understood that the latter is not restricted to the employment of the particular elements shown and described. Primarily I seek to provide for the ready disengagement of the drum to allow of the feeding out of the rope or cable without interfering with the momentum of the parts by which the winding operation is accomplished, so that immediately upon resuming the winding such momentum may be utilized.

The advantages of my invention are apparent to those skilled in the art.

I claim as my invention—

1. A windlass comprising a drum, a shaft therefor, a clutch for locking said drum to its shaft, means for operating the latter, a fly-wheel actuated by the revolution of the drum-shaft, and means for releasing and reapplying said clutch without interfering with the revolutions of the drum-shaft and fly-wheel, whereby the momentum of the latter may be utilized in renewing the winding operation after the drum has been released from its shaft.

2. A windlass comprising a drum, a shaft therefor, a clutch for locking said drum to its shaft, means for operating the latter, a second shaft geared to the drum-shaft, a fly-wheel on said second shaft, and means for releasing and reapplying said clutch without interfering with the revolutions of the drum-shaft and fly-wheel, whereby the momentum of the latter may be utilized in renewing the winding operation after the drum has been released from its shaft.

3. A windlass comprising a drum, a shaft therefor, a clutch for locking said drum to its shaft, means for operating the latter, a second shaft geared to the drum-shaft, a fly-wheel on said second shaft, a counter-shaft also geared to said drum-shaft, means for operating said counter-shaft, and means actuated by the latter for releasing and reapplying said clutch without interfering with the revolutions of the drum-shaft and fly-wheel.

4. The combination with the drum-shaft, the drum thereon, and a clutch for securing said drum to its shaft, of a counter-shaft geared to the drum-shaft, said counter-shaft being capable of being moved longitudinally, to apply and release said clutch, means actuated thereby for operating the latter, and means for aiding the initial winding operation after a temporary cessation thereof.

5. The combination with the drum-shaft, the drum thereon, and a clutch for securing said drum to its shaft, of a counter-shaft geared to the drum-shaft, said counter-shaft being capable of being moved longitudinally, means actuated thereby for operating said clutch, and a fly-wheel actuated by the revolution of said drum-shaft.

6. The combination with the drum-shaft, the drum thereon, and a clutch for securing said drum to its shaft, of a counter-shaft, a gear-wheel therefor having an interiorly-threaded hub, an exteriorly-threaded sleeve on said shaft working in the thread of said hub, means for locking said sleeve to and disengaging it from said shaft and also locking it to said gear-wheel, said shaft being movable longitudinally, and means actuated thereby for operating said clutch.

7. The combination with the drum-shaft, the drum thereon, and a clutch for securing said drum to its shaft, of a counter-shaft, a gear-wheel therefor having an interiorly-threaded hub, an exteriorly-threaded sleeve on said shaft working in the thread of said hub, means for locking said sleeve to and disengaging it from said shaft and also locking it to said gear-wheel, said shaft being movable longitudinally, means actuated thereby for operating said clutch, and a fly-wheel actuated by the revolution of said drum-shaft.

8. The combination with the longitudinally-movable shaft, of the gear-wheel having a fixed bearing, said gear-wheel having its hub interiorly threaded, an exteriorly-threaded sleeve working in said hub, means carried by said shaft for locking it to said sleeve when moved in one direction, said sleeve being then locked to said gear-wheel, and means for allowing said sleeve to turn with said gear-wheel independently of said shaft when the latter is unlocked therefrom.

9. The combination with the longitudinally-movable shaft, of the gear-wheel having a fixed bearing, said gear-wheel having its hub interiorly threaded, an exteriorly-threaded sleeve working in said hub, means carried by said shaft for locking it to said sleeve when moved in one direction, said sleeve being then locked to said gear-wheel, and a spring-pressed collar movable on and carried by said shaft and with which said sleeve is designed to engage when locked to said gear-wheel, said collar being disengaged from said sleeve when the latter and the shaft are moved longitudinally and said collar is brought into frictional engagement with such wheel.

In testimony whereof I have signed this specification in the presence of two subscribing witnesses.

THOMAS F. MASON.

Witnesses:
FRANCIS S. MAGUIRE,
VERNON E. WEST.